US007065345B2

(12) United States Patent
Carlton et al.

(10) Patent No.: US 7,065,345 B2
(45) Date of Patent: Jun. 20, 2006

(54) DATA PROCESSING APPARATUS AND METHOD FOR CORRELATION ANALYSIS

(75) Inventors: Stephen J. Carlton, c/o Terry Carlton, Jordan Price Wall Gray Jones and Carlton, 1951 Clark Ave., Raleigh, NC (US) 27609; Olle Bliding, Haverdal (SE); Jonas Runesson, Halmstad (SE); Anna Emanuelsson, Halmstad (SE); Lars Knutsson, Halmstad (SE); Joan C. Pritchett, Indianapolis, IN (US)

(73) Assignee: Stephen J. Carlton, Raleigh, NC (US)

( * ) Notice: Subject to any disclaimer, the term of this patent is extended or adjusted under 35 U.S.C. 154(b) by 607 days.

(21) Appl. No.: 10/125,404

(22) Filed: Apr. 19, 2002

(65) Prior Publication Data

US 2003/0199250 A1 Oct. 23, 2003

(51) Int. Cl.
*H04B 5/00* (2006.01)
*H04B 7/00* (2006.01)
*H04Q 7/00* (2006.01)

(52) U.S. Cl. ............................... 455/414.1; 455/414.2; 455/414.3; 455/41.2; 455/41.1; 455/41.3; 455/500

(58) Field of Classification Search ............... 455/41.2, 455/414.1, 500
See application file for complete search history.

(56) References Cited

U.S. PATENT DOCUMENTS 4,348,740 A 9/1982 White ........................ 364/900

(Continued)

FOREIGN PATENT DOCUMENTS

DE 44 18 234 C2 11/1995
DE 197 35 045 A1 2/1999

OTHER PUBLICATIONS

U.S. Appl. No. 10/125,461 entitled "A Portable Communication Apparatus and Method for Match-Making with Unique User ID" filed Apr. 19, 2002.

(Continued)

*Primary Examiner*—Lee Nguyen
*Assistant Examiner*—Wen W. Huang
(74) *Attorney, Agent, or Firm*—Finnegan, Henderson, Farabow, Garrett & Dunner, LLP

(57) ABSTRACT

A data processing apparatus, a method and computer program product for comparing a first object associated with said data processing apparatus with a second object associated with a remote data processing apparatus, are provided. The data processing apparatus comprises an input device operable to accept a first and a second set of data associated with said first object. Said first set of data describes said first object, and said second set of data describes a third object. Additionally, the data processing apparatus includes a memory. Said memory is adapted to store said first and said second set of data. The data processing apparatus further comprises a receiver. Said receiver is adapted to obtain a first subset of a third and a fourth set of data, respectively, from said remote data processing apparatus. Said third and said fourth set of data is associated with said second object, and said third set of data describes said second object, and said fourth set of data describes a fourth object. It also includes a transmitter. Said transmitter is adapted to send a first subset of said first and said second set of data, respectively, to said remote data processing apparatus. Finally, the data processing apparatus comprises a processor. The processor is adapted to perform correlation analysis between said first subsets of said first and said fourth set of data, respectively, to obtain a first value of correlation between said first and said second object. The processor is further adapted to perform correlation analysis between said first subsets of said second and said third set of data, respectively, to obtain a second value of correlation between said first and said second object.

29 Claims, 9 Drawing Sheets

U.S. PATENT DOCUMENTS

| | | | |
|---|---|---|---|
| 4,348,744 A | 9/1982 | White | 364/900 |
| 5,353,328 A * | 10/1994 | Jokimies | 455/558 |
| 6,020,810 A | 2/2000 | Har-Even | 340/328 |
| 6,150,937 A | 11/2000 | Rackman | 340/539 |
| 6,424,819 B1 * | 7/2002 | Yan | 455/414.1 |
| 6,549,768 B1 * | 4/2003 | Fraccaroli | 455/517 |
| 6,871,063 B1 * | 3/2005 | Schiffer | 455/410 |
| 6,889,065 B1 * | 5/2005 | Holmes et al. | 455/569.2 |
| 2004/0014457 A1 * | 1/2004 | Stevens | 455/414.1 |

OTHER PUBLICATIONS

U.S. Appl. No. 60/373,660 entitled "A Portable Communication Apparatus and Method for Match-Making with Distributed Memory" filed Apr. 19, 2002.

U.S. Appl. No. 29/155,456 design for "A Communication Device."

* cited by examiner

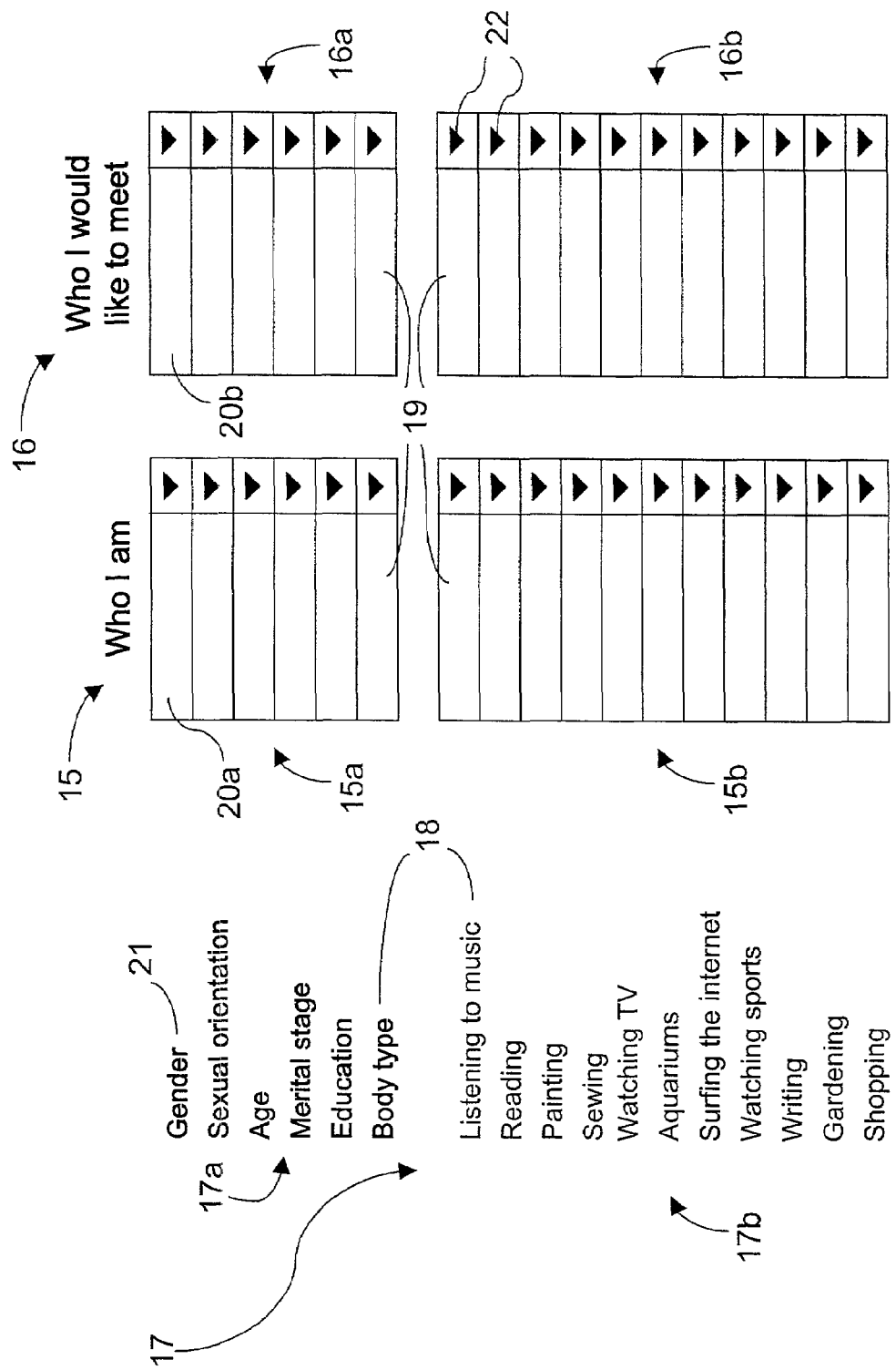

|   | 33a Gender | 34a Sexual orientation | 35a Age | 36a Merital status | 37a Education | 38a Body type |
|---|---|---|---|---|---|---|
| 1 | Female | Straight | 15 years and younger | Single | High school | Petite |
| 2 | Male | Gay | 16 years | Married | Junior college | Slim and medium height |
| 3 | Male or female | Lesbian | 17 years | Divorced | Technical/vocational college | Slim and tall |
| 4 |  | Bisexual | 18 years | Widowed | University graduate | Medium build and medium height |
| 5 |  |  | 19 years | Separated | University masters | Medium build and tall |
| 6 |  |  | 20 years | Single parent | University doctorate | Large build and medium height |
| 7 |  |  | 21 years |  |  | Large build and tall |
| 8 |  |  | 22 years |  |  | Athletic |
| 9 |  |  | 23 years |  |  | Very muscular |
| 10 |  |  | 24 years |  |  | A little bit extra |
| 11 |  |  | 25-30 years |  |  | Any/not sure |
| 12 |  |  | 31-35 years |  |  |  |
| 13 |  |  | 36-40 years |  |  |  |
| 14 |  |  | 41-50 years |  |  |  |
| 15 |  |  | 51-60 years |  |  |  |
| 16 |  |  | 61 years and older |  |  |  |

*Fig 7a*

| Combination | Point | Maxpoint |
|---|---|---|
| Agree- Agree | 2 | 2 |
| Agree- Don't care | 1 | 2 |
| Agree- Disagree | -2 | 2 |
| Don't care- Agree | 0 | 0 |
| Don't care- Don't care | 0 | 0 |
| Don't care- Disagree | 0 | 0 |
| Disagree- Agree | -2 | 2 |
| Disagree- Don't care | 1 | 2 |
| Disagree- Disagree | 2 | 2 |

39

| Must Match | Query Points | Max |
|---|---|---|
| 1 | 2 | 2 |
| 1 | 2 | 2 |
| 1 | 0 | 0 |
| 1 | 0 | 0 |
| 1 | -2 | 2 |
| 1 | 0 | 0 |
| | 0 | 0 |
| | 1 | 2 |
| | 2 | 2 |
| | 0 | 0 |
| | 2 | 2 |
| 1 | 8 | 12 |

40 → (Points column) 41 → (Max column)

Result: 66.67%

*Fig 7c*

DATA PROCESSING APPARATUS AND METHOD FOR CORRELATION ANALYSIS

TECHNICAL FIELD

The present invention relates to a data processing apparatus, a method and a computer program product for comparing a first object, associated with said data processing apparatus, with a second object, associated with a remote data processing apparatus.

BACKGROUND ART

There are many areas within which it is desirable to perform correlation analysis between sets of data to find out whether two or more objects match or not. One example of such an area is dating, where there are two objects in the form of two persons, one set of data being information associated with one of the two persons, and another set of data being information associated with the other one of them. Information will be exchanged between the two persons, they will both perform a correlation analysis between their own information and the received information, and then usually they will have a feeling whether there is a match between them or not. Depending on the dating situation, the exchange of information will be performed in different ways. For example, in one situation one of the above persons has inserted a personal advertisement in a newspaper or on the internet, and the other person has replied to it. The exchange of information is then usually made by writing letters or e-mails. Another example is the situation where the two persons meet in a coffee shop or a nightclub. The exchange of information is then simply made by talking.

A problem with the above dating methods and conventional dating in general, is the considerable risk that two partly randomly chosen persons will not match. Not seldom, it takes considerable time before two persons realize that they do not match. If the dates are not supposed to be like quizzes, it will take time for two persons to know enough about each other to tell a match from a mismatch. Therefore, finding the right partner can be very difficult and also very time consuming, since one probably will have to date a number of different persons before one finds the ideal partner.

From U.S. Pat. Nos. 4,348,740, 4,348,744 to White, a method and an apparatus for comparison of sets of personal data are known. Users can enter data about themselves in the portable apparatuses and then compare their data by physically interconnecting the apparatuses by means of connectors. Scores representing the compatibilities between users are shown on the apparatuses.

From German patent application DE 197 35 045 an information handling unit for comparing personality profiles is known. Like in the White invention above, users physically interconnect their apparatuses to compare stored data. Two interconnected units signal if there is a match between their users.

A major disadvantage with both of the above known devices is that users have to carry their devices in full view to be able to find each other, which means that everybody can see who is carrying such a device. Another great disadvantage is that users have to be very active and search for other users. Additionally, when two users have seen each other, if they find each other interesting, they will have to make contact in order to be able to compare their information, an indiscrete situation which in many ways can be very uncomfortable.

From U.S. Pat. No. 6,150,937 to Rackman, a personal contact "Ice Breaker" is known. One type of contact badges are distributed to the boys in a group and one type to the girls in the group. All badges are provided with a light that can blink, and opposite badges in proximity with each other transmit and receive contact signals. If the lights on two badges blink at the same time, the carriers of the badges should start talking to each other. Whether this happens or not is based on probability and the blinking is therefore no indication of an actual match between the carriers.

From U.S. Pat. No. 6,020,810 to Har-Even, a device and a method for finding a date/mate is known. A user enters personal data into his/her device. The data is transmitted to, and other data is received from, another device. The received and the transmitted data is compared, and a percentage match between them is determined. An alarm is activated if the percentage match is greater than a predetermined value.

From German patent DE 44 18 234 to Weiszhar, a unit similar to the Har-Even device is known. Also in this invention, data entered by a user is transmitted to, and other data is received from, another unit. If there is a mutual match between two units, their users will be alerted.

In the devices according to the state of the art briefly described above, the entered information concerning the user of a device, and in some of the cases also his/her desired partner, will be transmitted to other devices in order to find a matching partner. Thus, the information will be transferred to complete strangers having a device for receiving such information. This is a threat to the personal integrity of the user, since the information might contain very personal details about him/her that he/she does not wish to share with just anybody, but which details must be shared for the matching to be successful. Additionally, with the above discussed devices, a very high percentage match between two users can be very misleading. As an illustrative example, between two users in the form of a man of the age 45 and a girl of the age 17, who would have each other as ideal partners if it was not for the age difference, since they share the same interests and values, there will be a very high percentage match. This indicates a very successful match, but in reality they would most certainly not make a good couple. The same line of reasoning can be followed regarding gender and sexual orientation. There can be a 90% match between a man and a woman of each others ideal age. However, if for example the man is a homosexual, the match will not be successful in spite of the high percentage match.

SUMMARY OF THE INVENTION

In view of the above, a purpose of the present invention is to provide a solution to the problems concerned with prior art.

In particular, a purpose is to provide an invention for effective, safe and simple comparison of two objects to see if they match.

Generally, the above objectives are achieved by a data processing apparatus, a method and a computer program product according to the attached independent patent claims.

The basic concept of the invention is to provide two sets of data for each of the two objects, one set describing the object itself, and the other set describing a desired object. Correlation analysis is performed between the objects by "crosswise" comparison of their sets of data, i.e., for each object, the set of data describing the object itself is compared with the set of data describing the desired object for the other object. Thus, not all data for one of the objects will be exposed to the other object. In this way, sensitive data describing the objects themselves will be protected.

A first aspect of the invention is a data processing apparatus for performing the above operations, i.e. for comparing a first object, associated with the data processing apparatus, with a second object, associated with a remote data processing apparatus. To this end, the data processing apparatus comprises an input device, by means of which a first user may input a first and a second set of data associated with the first object. The first set of data describes the first object and the second set of data describes a third object. The first user may himself/herself be the first object, and then the first set of data describes himself/herself. The third object is not a real object, but an object that the first object wants to find. If the first object is the first user, then the third object might be another, ideal user.

A memory is further comprised in the data processing apparatus according to the present invention. The memory is adapted to store the above mentioned first and second sets of data associated with the first object after the input.

The data processing apparatus further comprises a receiver for receiving information from the remote data processing apparatus. The information contains a first subset of a third and a fourth set of data, respectively. The third and the fourth set of data are associated with the second object. The third set of data describes the second object and the fourth set of data describes a fourth object. The second object may be a second user of the remote data processing apparatus. If so, the third set of data describes the second user. Like the third object, the fourth object is not a real object, but an object that the second object wants to find. If the second object is the second user, then the fourth object might be another, ideal user.

Moreover, the data processing apparatus associated with the first object is arranged to transmit a first subset of the first and the second set of data, respectively, to the remote data processing apparatus. For that purpose, the data processing apparatus further comprises a transmitter.

For the correlation analysis mentioned above, a processor is comprised in the data processing apparatus. The processor is arranged to compare the first subset of the of the first set of data with the first subset of the fourth set of data. The result of this comparison is a first value of correlation between the first and the second object. This first value of correlation is a measure of how much alike the first subset of the fourth object is with the first subset of the first object. In the case discussed above, where the objects are users, if the first value of correlation is high, the first user, at least partly, is very alike the fourth user, i.e. the user that the second user wants to find. On the other hand, if the first value of correlation is low, the fourth user is rather different from the first user. The processor is further arranged to compare the first subset of the second set of data with the first subset of the third set of data. The result of this comparison is a second value of correlation between the first and the second object. This second value of correlation is a measure of how much alike the first subset of the third object is with the first subset of the second object. Like above, if the objects are users, a high second value of correlation means that the second user, at least partly, is very alike the third user, i.e. the user that the first user wants to find. Of course, if the first user is very alike the one that the second user wants to find, and the second user is very alike the one that the first user wants to find, both the first and the second correlation value will be high.

The receiver is preferably also arranged to receive a second subset of the fourth set of data from the remote data processing apparatus. Additionally, the transmitter is preferably adapted to transmit the corresponding data to the remote data processing apparatus, i.e. the second subset of the second set of data.

If the first and second values of correlation both are sufficiently high, i.e. if they meet or exceed a first and a second threshold value, respectively, the processor is preferably arranged to continue the correlation analysis. Then, a second subset of the first set of data is compared with the second subset of the fourth set of data. The result of this comparison is a third value of correlation between the first and the second object. This third value of correlation indicates how much alike the fourth object is with the first object. If the objects are users, a high third value of correlation means that the first user actually is very alike the fourth user, and that the first user complies with the second user's requirements.

The first, second and third values of correlation can be numbers between 0 and 1. The first and second threshold values are preferably both equal to 1. This means that the first and second values of correlation both have to be equal to 1 in order for the processor to proceed with the correlation analysis. In other words, the first subset of the second set of data must conform completely to the first subset of the third set of data, and the first subset of the fourth set of data must conform completely to the first subset of the first set of data, for the correlation analysis to continue.

Additionally, the memory is preferably adapted to store at least one profile kit containing a first and a second profile. The first set of data associated with the first object corresponds to the third set of data associated the second object, and therefore the first and third sets of data each will contain a respective result of a completion of the first profile, and they will thus have the same structure. Correspondingly, the second and fourth sets of data each will contain a respective result of a completion of the second profile.

preferably, the first and second profiles in every profile kit relate to at least one set of questions, the memory preferably being adapted to store the questions. Then, the above mentioned completions will correspond to answers to these questions. Thus, the first set of data will contain the answers for the first object, the second set of data the answers for the third, desired object, the third set of data the answers for the second object and the fourth set of data the answers for the fourth desired object. In the situation described above, where the objects are users, this means that the first and the second user each have completed a respective first profile with the answers in accordance with themselves, and a respective second profile with the answers in accordance with the user that they want to meet.

According to one embodiment of the present invention the second subsets of the respective sets of data contain no data, i.e. the second subsets are all "empty". Then, the first subsets of the respective sets of data will contain all the data, i.e. the data in the respective sets of data will actually be the data in the respective first subsets. In that case, the correlation analysis will be terminated after the determination of the first and the second value of correlation. The third value of correlation will then be set equal to one if the first and the second value of correlation both meet or exceed the first and the second threshold value, respectively, and equal to zero if not.

According to another embodiment of the present invention the first subsets of the respective sets of data contain no data, i.e. the first subsets are all "empty". Then, the second subsets of the respective sets of data will contain all the data, i.e. the data in the respective sets of data will actually be the data in the respective second subsets. In that case the first and second values of correlation will both be set equal to one, and the correlation analysis will instead begin with the part previously referred to as the continuation of the correlation analysis.

The data processing apparatus according to the present invention preferably further comprises an antenna. The antenna is coupled to the receiver and the transmitter and they are jointly adapted for radio frequency communication with the remote data processing apparatus. This means that the data processing apparatus will communicate wirelessly with the remote data processing apparatus. Thus, the users of the apparatuses will be able to find partners without having to make direct contact with other users. In this way, users will be able keep their anonymity. Also, the search will not require the users' explicit interaction.

The radio frequency communication is preferably in accordance with the Bluetooth™ specification, by means of which the data processing apparatus can be given a range of approximately 10–100 m. Also, radio communication is preferred since it is insensitive to direction, i.e. two apparatuses do not need to be in each others' direct line-of-sight in order to be able to communicate, and relatively insensitive to interference in its frequency band.

preferably, the data processing apparatus further includes an alert device for emitting an alert if the third value of correlation meets or exceeds a third threshold value. In other words, the alert device alerts a user when he/she conforms to who another user wants to meet. Depending on the situation, different alerts may be suitable. The alert device is preferably arranged to emit all or at least one of the following: an audible alert, such as a sound or a song, a perceptible alert, such as a vibration, or a visual alert, such as flashing light.

The third threshold value can preferably be chosen by a user. There are two options, either it can be chosen by the user of the data processing apparatus (previously referred to as the first user), or by the user of the remote data processing apparatus (previously referred to as the second user).

According to a preferred embodiment, the data processing apparatus is used as a mating apparatus. Then, the questions are of personal character and the objects are human beings. The first and second objects are the first and second users, respectively, and the third and fourth users are desired, ideal users for the first and second users, respectively. A match is considered for the second user with the first user, i.e. the first user complies with the requirements of the second user, if the third value of correlation meets or exceeds the third threshold value. This embodiment allows for users to, relatively simple, find matching partners for different purposes.

The input device of the data processing apparatus preferably comprises a keyboard, by means of which data can be entered. Additionally, or alternatively, the data processing apparatus comprises a connector to an external computer. Data can then first be entered into the computer and then be downloaded by the connector into the data processing apparatus. It is also possible for the data processing device to communicate wirelessly with the external computer, i.e. without the use of the connector, by means of, for example, infrared communication.

Also, for the interaction with a user, the data processing apparatus preferably includes a display. Preferably it further comprises encryption means for encrypting data prior to transmission, and decryption means for decrypting data after reception. This increases the safety for a user of the apparatus and preserves the user's personal integrity.

A data processing apparatus according to the present invention is preferably wireless and portable, allowing a user to discreetly carry his/her apparatus with him/her practically anywhere.

Finally, a data processing apparatus according to the present invention may advantageously be included in mobile terminals, such as mobile phones, personal Digital Assistants (PDAs) or other handheld devices. Since the ownership of such devices is so widespread, many people will then have access to the present invention.

A second aspect of the invention is a method of comparing a first object, associated with a data processing apparatus, with a second object, associated with a remote data processing apparatus. The method comprises inputting a first and a second set of data into the data processing apparatus, storing the first and the second set of data in the data processing apparatus, and receiving a first subset of a third and a fourth set of data, respectively, from the remote data processing apparatus into the data processing apparatus. The method further comprises transmitting a first subset of the first and the second set of data, respectively, to the remote data processing apparatus from the data processing apparatus, and performing, by means of the data processing apparatus, correlation analysis between the first subsets of the first and the fourth set of data, respectively, and between the first subsets of the second and the third set of data, respectively, to obtain a respective first and a respective second value of correlation. The terms used in the discussion of the second aspect of the invention are the same as the ones used in the discussion of the first aspect of the invention. Therefore, these terms are not explained once again.

A third aspect of the invention is a computer program product directly loadable into a memory of a processor, where the computer program product comprises program code for performing the method according to the second aspect when executed by said processor.

The second and third aspects have essentially the same advantages as the first aspect described above.

Other objectives, features and advantages of the present invention will appear from the following detailed disclosure, from the attached subclaims as well as from the drawings.

BRIEF DESCRIPTION OF THE DRAWINGS

FIG. 4 illustrates a completion of profiles in a profile kit according to the present invention.

FIG. 5b shows the result of an exchange of information between the data processing apparatuses in FIG. 5a.

FIG. 7a is a table showing possible answers to complete the profiles with.

FIG. 7c illustrates determination of a result of correlation analysis between the two fictitious users in FIG. 7b.

DETAILED DESCRIPTION OF EMBODIMENTS

Hereinafter, the present invention will be described more in detail with reference to the accompanied drawings.

Figure 1A:
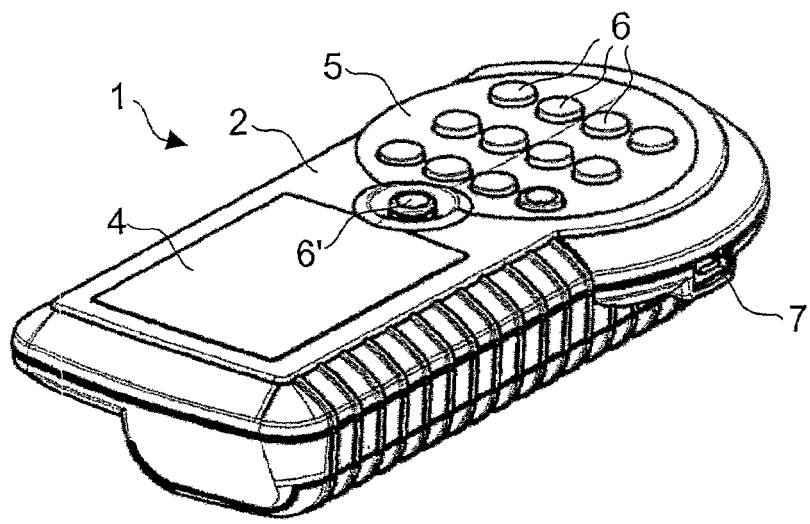
FIGS. 1a, 1b and 1c is a perspective view, a top view and a side view, respectively, of a data processing apparatus according to one embodiment of the present invention.
Figure 1B:
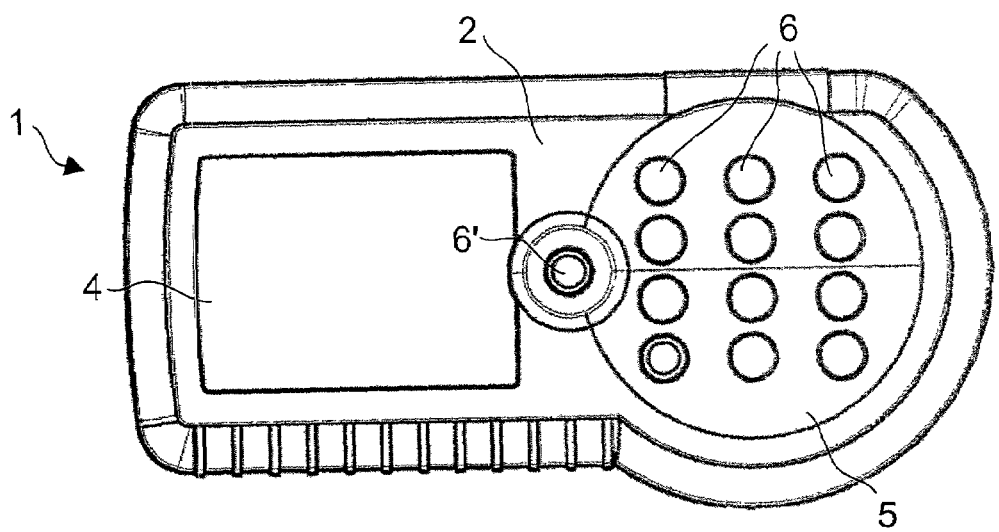
Figure 1C:
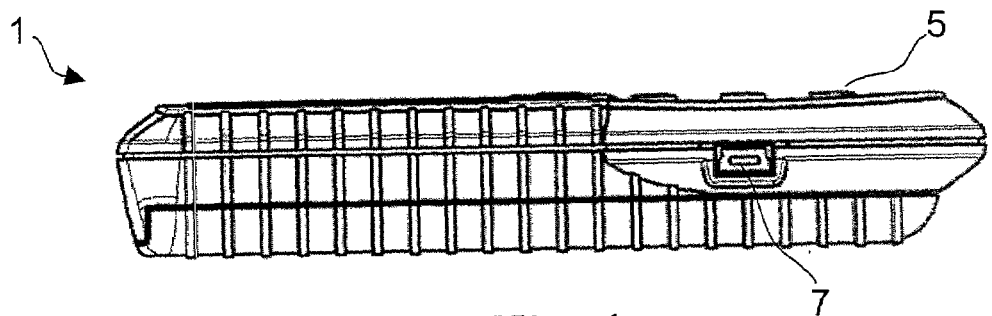
Figure 2:
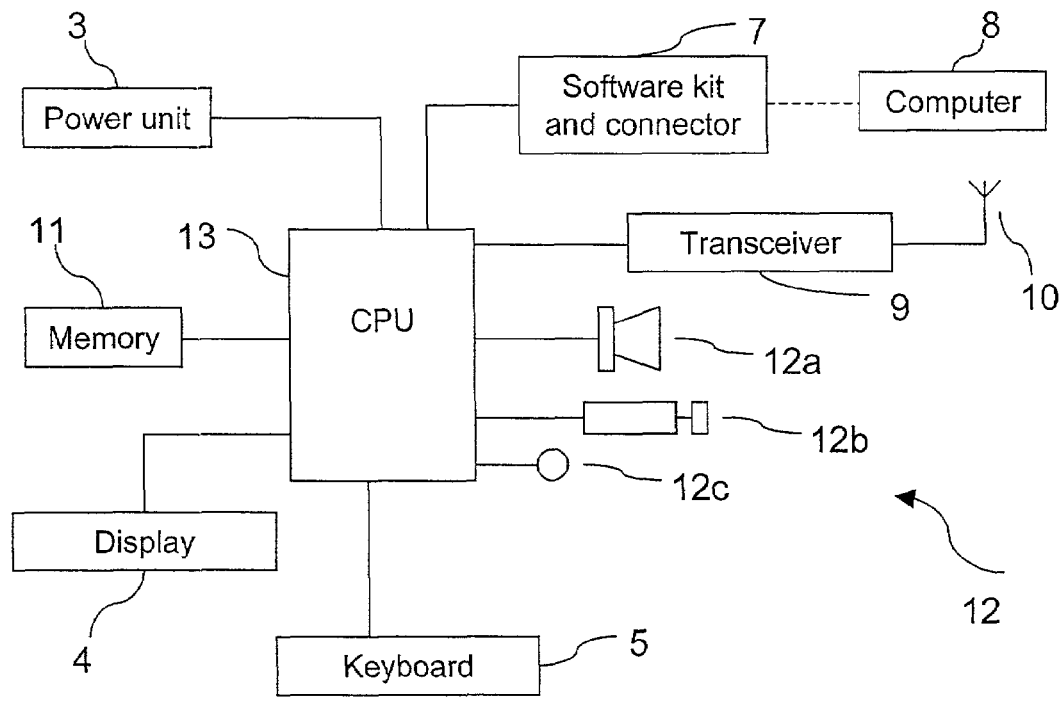
FIG. 2 is block diagram describing the structure of the data processing apparatus according to FIGS. 1a–1c.

FIGS. 1a–1c show a data processing apparatus 1 according to a preferred embodiment of the present invention. The data processing apparatus in this embodiment operates as a wireless portable mating/dating apparatus, assisting a person using the data processing apparatus in meeting other people with such data processing apparatuses. FIG. 2 is a block diagram corresponding to the data processing apparatus in FIGS. 1a–1c, schematically showing its components and illustrating its internal structure.

The wireless portable data processing apparatus 1 comprises a casing 2 which is small enough for the data processing apparatus to be held in one hand or carried in, for example, a pocket or a handbag. The casing can have a number of different designs when it comes to shape, colors etc., and it is preferably removable allowing a user to change the appearance of his/her data processing apparatus by replacing the casing with another one. A power unit 3 is further arranged inside the casing 2.

Further, the apparatus 1 preferably comprises a display 4 for interaction with the user of the data processing apparatus, showing, for example, the power level for the power unit 3, the time and date and icons.

Also, a keyboard 5 is preferably comprised in the data processing apparatus, allowing the user to manage the data processing apparatus 1 by operating a number of keys 6 and a joystick 6'. According to one embodiment, the keyboard 5 have a design similar to the one on a modern mobile phone, i.e. each key 6 corresponds to a number of symbols, such as numerals and/or letters. As an alternative or a complement to the keyboard 5, the data processing apparatus 1 can be supplied with a software kit and a connector 7 for managing the data processing apparatus by an external computer 8.

For the exchange of information between the data processing apparatus according to the present invention and a remote data processing apparatus, the data processing apparatus 1 comprises a transceiver 9. The transceiver 9 is in the preferred embodiment adapted for short-range radio communication in accordance with, e.g., the Bluetooth standard in the 2.4 GHz ISM band ("Industrial, Scientific and Medical"). Thus, the data processing apparatus 1 also has an antenna 10 for transmitting to, and receiving from, remote data processing apparatuses located within the range of the antenna 10, radio frequency signals defining the operating frequencies for the transceiver 9 and transceivers of remote data processing apparatuses, respectively. Preferably, the transceiver 9 and the antenna 10 have a range of approximately 10–100 m (328 ft.), although the range can vary due to environmental conditions.

In alternative embodiments the transceiver can instead be adapted for infrared communication (such as IrDA—"Infrared Data Association"), or essentially any other available standard for short-range communication between a handheld apparatus and an external apparatus.

A data processing apparatus 1 according to the preferred embodiment is associated with a unique apparatus-specific user-id identifying the data processing apparatus to remote data processing apparatuses within range. If the transceiver 9 is adapted to Bluetooth communication, the unique apparatus-specific user-id will be a unique BD address in accordance with the Bluetooth specification.

Before information is exchanged between the data processing apparatus according to the present invention and a remote data processing apparatus, all information is advantageously encrypted to increase the safety and privacy for users. Therefore, the data processing apparatus 1 preferably comprises encryption and decryption means for encrypting information prior to transmission, and decrypting information after reception. The preferred embodiment uses a data encryption algorithm commonly known as SAFER+. The encryption means advantageously operates according to any data encryption algorithm known per se, such as an asymmetric algorithm like RSA, or a symmetric algorithm like DES. The decryption means will operate in accordance with the corresponding data decryption algorithm. Advantageously, the encryption and decryption means are implemented as software modules executed by a processor in the data processing apparatus 1, or alternatively as hardware.

For the storing of information in the data processing apparatus 1, i.e. information needed for the function of the data processing apparatus, such as program code and static data, information entered by the user of the data processing apparatus, and information received from remote data processing apparatuses, the data processing apparatus comprises a memory 11.

Additionally, for further interaction with the user, the data processing apparatus 1 has alerting means 12, such as a buzzer 12a for emitting ring tones, a vibrator 12b for a more discrete alerting and a LED 12c for emitting light.

Finally, a CPU 13 in the data processing apparatus 1 controls all the operations of the data processing apparatus.

In the preferred embodiment, the transceiver 9 is a BiCMOS class 1 Bluetooth radio module, which is of type PBA31302/1 and is available from Ericsson Microelectronics AB, Isafjordgatan 16, SE-164 81 Kista, Sweden. The radio module has a 13 MHz crystal, which is available from Taitien Electronics Co., Ltd, 5 Fl. 76, Po Ai Road, Taipei, Taiwan 100.

The selection of the antenna 10 will depend on the design of the casing 2 as well as its desired size, format and flexibility. In the preferred embodiment, an ICM antenna which fits to the inside of the casing is selected. The IMC antenna is available from gigaAnt, Ideon Science & Technology park, Ole Römers väg 16, SE-223 70 Lund, Sweden. Alternatively, a Flavus/Crispus antenna from the same company may be used.

The CPU 13 is a Bluetooth baseband processor of type PBM99090/1, which is available from Ericsson Microelectronics AB. It uses a clock frequency derived from the radio clock signal and includes an ARM7 RISC (12–40 MHz), which provides adequate performance for the functionality of the apparatus 1. The baseband processor has a 64 KB internal RAM memory and handles communication protocols (Bluetooth embedded stack ver 1.00) as well as the higher-level functionality of the apparatus 1, as described throughout this document.

The memory 11 associated with the CPU 13 consists of a 1 MB flash memory, a 512 KB external static RAM (SRAM) memory and a serial 32 KB EEPROM memory, wherein the latter acts as a scratch-pad memory for the functionality provided by the apparatus 1. The flash memory is of type BGA48, which is available from Silicon Storage Technology, Inc., 1171 Sonora Court, Sunnyvale, Calif. 94086, USA, under article number SST39VF800A-70-4C-B3K. The SRAM memory is of type BA48B and is available from Cypress Semiconductor Corporation, 3901 North First Street, San Jose, Calif. 95134, USA, under article number CY62147CV25LL-70BAI. The EEPROM memory is of type SOIC-8 and is available from Atmel Corporation, 2325 Orchard parkway, San Jose, Calif. 95131, USA, under article number AT24C256N-10SC-2.7.

The connector provides a serial interface to the external computer 8 and comprises, in the preferred embodiment, an RS-232 interface as well as a USB interface, both of which are supported by the baseband processor. USB provides the most user-friendly interface, is faster and has the cheapest hardware. It also makes it possible to power/charge the apparatus 1 while connected, as USB also provides power through its communication cable. RS-232, on the other hand, does not provide power. Thus, in that case charging has to be done through the power unit 3. The power unit 3 comprises four AAA battery cells connected in series with each other, and a step-down converter, which is of type MAX1724EZK27-T and is available from Maxim Integrated products, Inc., 120 San Gabriel Drive, Sunnyvale, Calif. 94086, USA. The battery cells may be of rechargeable type and may receive charging power from either an internal or an external AC/DC converter. Some embodiments of the invention may use battery technologies known from the field of mobile telephones, such as Li ion, Li polymer, NiMH or NiCd batteries.

The display 4 is a 64×128 LCD module of type WD-G1206Y-1WNNa, which is available from Wintek Corporation, 427 North Sixth Street, Lafayette, Ind. 47901-1126, USA.

The buzzer 12a is a MQT-03EX buzzer from Star Micronics Co., Ltd, 20–10, Nakayoshida, Shizuoka 422-8654, Japan.

The vibrator 12b and the LED indicator 12c may be selected from various appropriate available component manufacturers.

Figure 3:
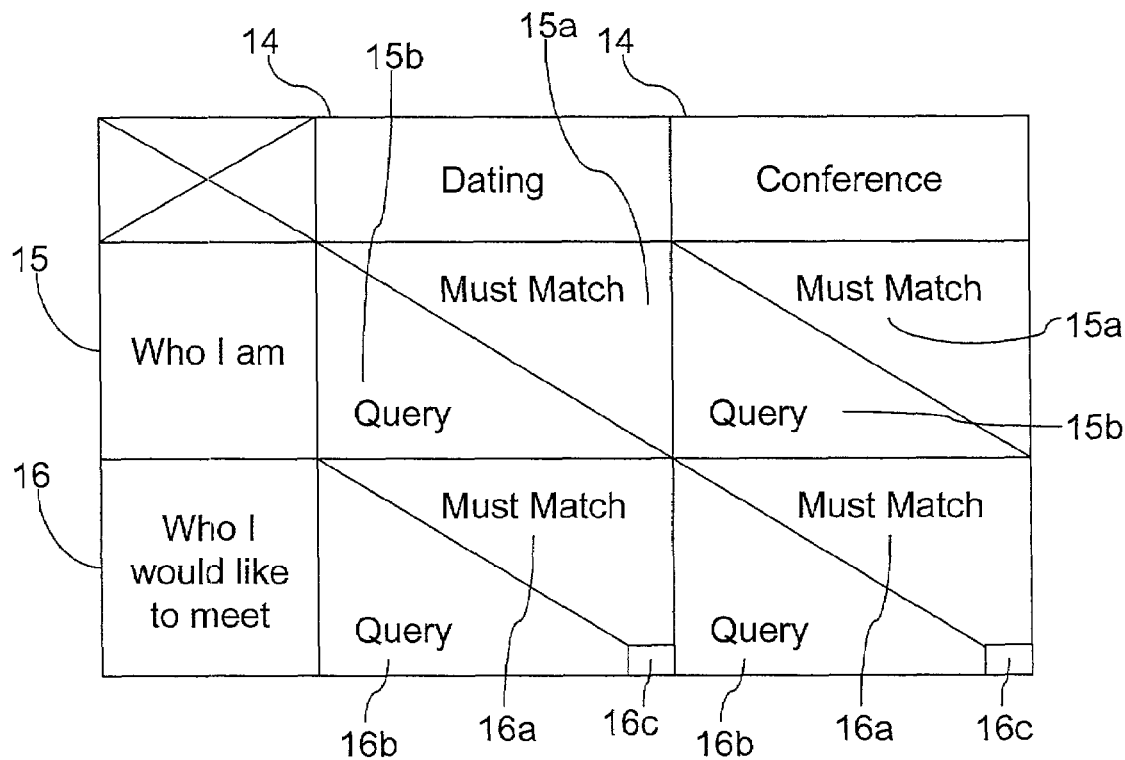
FIG. 3 shows examples of profile kits according to the present invention.

In the memory 11, a number of customized profile kits 14 may be stored, see FIG. 3, each profile kit corresponding to an area of matchmaking, such as, for example, finding a date ("Dating") or maybe a person with a certain competence on a conference ("Conference"). Each profile kit 14 preferably contains two profiles, one "Who I am"-profile 15 for the user of the data processing apparatus himself/herself, and one "Who I would like to meet"-profile 16 for the person the user wishes to find. Each of the two profiles 15, 16 in each of the profile kits 14 contains two parts, one "Must Match"-part 15a, 16a and one "Query"-part 15b, 16b.

Attached to each "Who I would like to meet"-profile 16 is a personal information tag 16c. The personal information tag carries particulars about the user of the data processing apparatus, such as an address, a phone number, etc. For example, the particulars in the personal information tag for the Dating profile kit might be a description of clothing or a mobile phone number, whereas the particulars in the personal information tag for the Conference profile kit instead might be an email address or an internet address for a company's home page.

A number of sets of questions are also stored in the memory 11. Each set of questions is associated with one profile kit 14, and the character of the questions in one specific set depends on the corresponding area of matchmaking. For example, if the user is on a conference searching for a person with certain skills, a different set of questions is used for the search than if the user instead is on a nightclub looking for a partner. FIG. 4 shows an example of a set 17 of questions 18 that can be associated with the Dating profile kit, since the answers to those questions help to reveal a person's personality.

The profiles 15, 16 in a specific profile kit 14 each contain a number of information records 19. The number of records 19 in each of the two profiles 15, 16, is equal to the number of questions in the corresponding set of questions. Each record 19 in the profiles 15, 16, is to be completed with information, or more particularly, an answer to a respective one of the questions 18 in the set 17. As an example, each of the records 20a, 20b in the two profiles 15, 16 should be completed with an answer to the question 21, "Gender". Thus, if the user is a man who wants to meet a woman, the record 20a in the "Who I am"-profile 15 should be completed with the answer "Male", and the record 20b in the "Who I would like to meet"-profile 16 should be completed with the answer "Female".

Since the profiles 15, 16 each contains two parts, one "Must Match"-part 15a, 16a, and one "Query"-part 15b, 16b, the questions 18 in the set 17 are divided into two groups, one group 17a of "Must Match"-questions and one group 17b of "Query"-questions. As the name implies, the "Must Match"-questions are of crucial nature. In the preferred embodiment, they must be completely fulfilled for two persons, for there to be any chance at all for a match between them. The "Query"-questions are of "less importance". They do not need to be completely fulfilled for two persons, but fulfilled up to a certain level, for a match. As in the example with dating and FIG. 4, if a heterosexual man would like to meet a partner, the partner has to be a heterosexual or bisexual woman or there will be no match. Thus, "Gender" and "Sexual orientation" belongs to the group of "Must Match"-questions 17a. However, if the man likes music and he would like to meet a partner who also likes music, there is a possibility for a match even with a partner who does not like music. Thus, "Listening to music" belongs to the group of "Query"-questions 17b.

Associated with every record 19 in the profiles 15, 16 is a symbol 22 under which there is a number of possible answers to a question 18. The type of possible answers to a question depends on which group the question belongs to, i.e. if the question is a "Must Match"-question or a "Query"-question.

The possible answers to the "Query"-questions are expressions stating how much a quality or an activity agrees with someone's personal interests, like for instance the expressions "agree", "don't care" and "disagree". As an example, if the question concerns "Shopping" and the user loves shopping, the answer to the question in the profile 15 should, of course, be "agree". If the user wants a partner who is also fond of shopping, the answer to the question in the profile 16 should also be "agree". On the other hand, if the user does not care that much about the shopping interest of a potential partner, the answer to the question in the profile 16 could instead be "don't care".

The possible answers to the "Must Match"-questions is a number of alternatives, the type of alternatives depending, of course, on the character of the question. This is illustrated below with reference to FIG. 7a.

All users of a data processing apparatus 1 according to the present invention must personalize their data processing apparatuses by inputting the information described above. In the preferred embodiment, this is done by the questions, one by one, being shown on the display 4, and the user completing the profiles 15, 16 with answers, and the personal information tag 16c, by operating the keys 6 and the joystick 6'. In the alternative embodiment with the software kit and the connector 7, and the external computer 8, the user instead views the questions on the computer screen and completes the profiles, and the personal information tag, by means of the computer keyboard. After completion, the information is being downloaded to the data processing apparatus 1 by means of the connector.

For the sake of simplicity, focus will be kept on the dating aspect of the data processing apparatus in the rest of this description. Thus, for the personalization, the user chooses the Dating profile kit among the stored profile kits 14 in the memory 11. He/she completes his/her "Who I am"-profile 15 about himself/herself with answers to the associated set of questions 17, by choosing at least one of the alternative answers to each question. In a corresponding way, he/she also completes his/her "Who I would like to meet"-profile 16 about the person he/she would like to meet. Finally, he/she completes the personal information tag 16c with particulars about himself/herself.

Figure 5A:
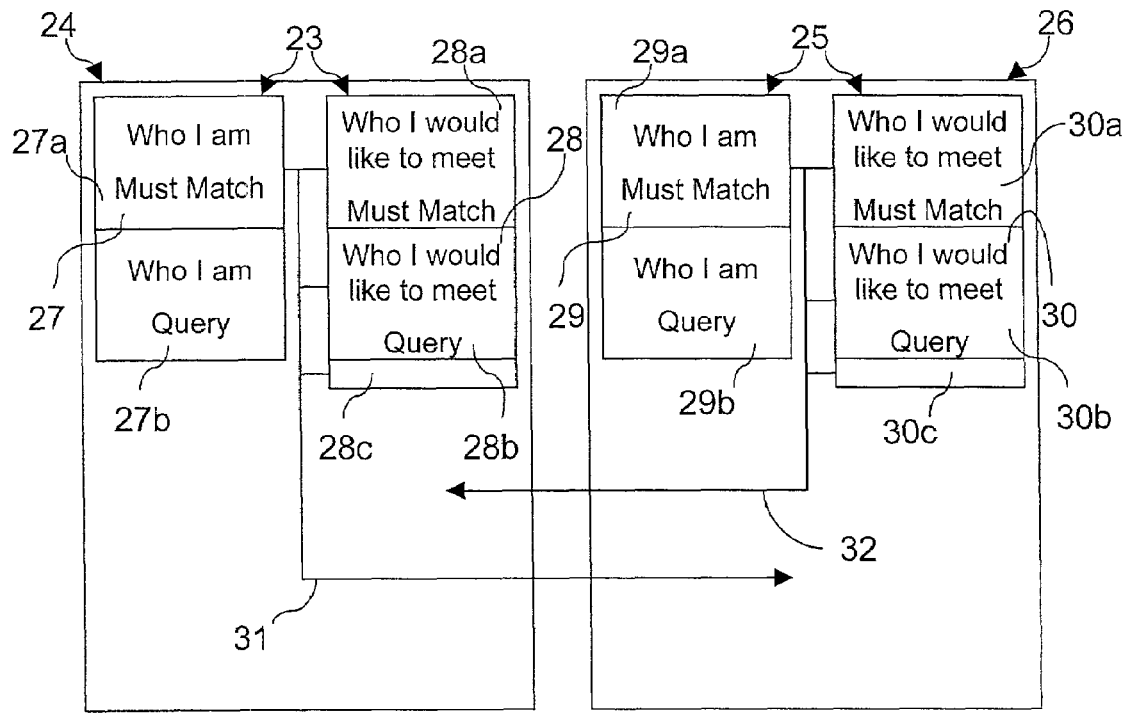
FIG. 5a illustrates the information structure for two data processing apparatuses according to FIGS. 1a–1c.

In FIG. 5a the entered information 23 in a first apparatus 24 (data processing apparatus) associated with a first user (first object) is shown schematically together with the entered information 25 in a second apparatus (remote data processing apparatus) associated with a second user (second object). The information 23 consists of a "Who I am"-profile 27 (first set of data) describing the first user, and a "Who I would like to meet"-profile 28 (second set of data) describing a third user (third object) that the first user would like to meet. In a corresponding way the information 25 consists of a "Who I am"-profile 29 (third set of data) describing the second user, and a "Who I would like to meet"-profile 30 (fourth set of data) describing a fourth user (fourth object) that the second user would like to meet. Thus, the first and the second users are actual, real-world persons, whereas the third and the fourth users are virtual, desired ones only. As described above, each of the profiles consists of a "Must Match"-part (first subset) 27a, 28a, 29a and 30a, and a "Query"-part (second subset) 27b, 28b, 29b and 30b. Additionally, a personal information tag 28c, 30c is attached to each of the "Who I would like to meet"-profiles 28 and 30.

Since the apparatuses are wireless, portable and relatively small, the first and the second user can carry her/his apparatus with her/him practically anywhere. The apparatuses operate without the user's explicit interaction. At regular time intervals, the length and the spacing of which can be chosen individually by the users, each of the first and second apparatuses transmits a radio frequency signal by means of its antenna. This so called inquiry is to be further discussed below with reference to FIG. 8. If the first and the second user come sufficiently close to each other, i.e. if the distance between them is less than the range of the antennas, the first and the second apparatus will receive each other's transmitted signal and thereby "discover" each other. Upon discovery, if certain circumstances are fulfilled, which circumstances will be discussed with reference to FIG. 8, the first and the second apparatus will exchange information according to the arrows 31, 32 in FIG. 5a. The "Must Match"-part 27a of the "Who I am"-profile 27, the "Must Match"-part 28a and the "Query"-part 28b of the "Who I would like to meet"-profile 28, and the personal information tag for the first apparatus 28c, are transmitted to the second apparatus (arrow 31) and vice versa (arrow 32). Thus, the only information not exchanged between the first and the second apparatus upon discovery is the "Query"-parts 27b, 29b of the "Who I am"-profiles 27, 29. The result of the exchange can be seen in FIG. 5b.

Figure 6A:
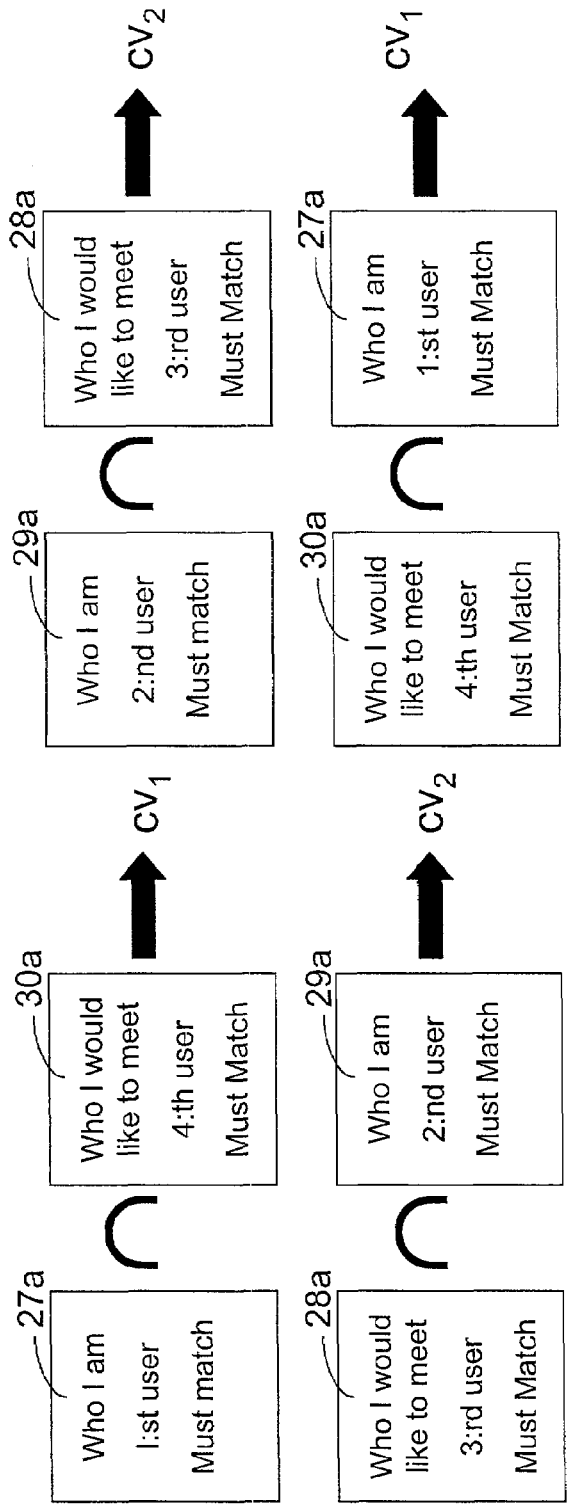
FIG. 6a illustrates correlation analysis in a first step.
Figure 6B:
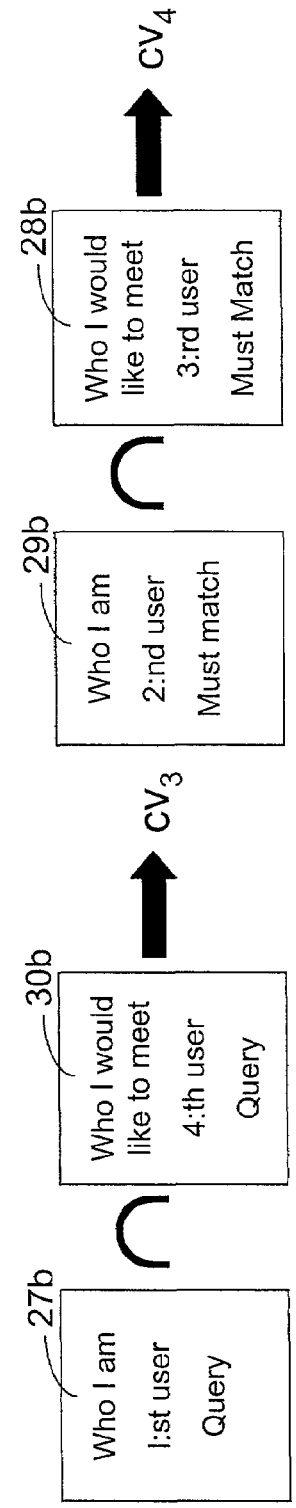
FIG. 6b illustrates correlation analysis in a second step.

When the exchange of information is completed, correlation analysis between the information entered by the first and the second user will be performed. In FIGS. 6a, 6b the analysis is schematically illustrated. For the sake of clarity, the boxes representing the different parts of the information in FIGS. 6a, 6b have been provided with facts indicating: type of profile, user described and part of profile.

The first step of the correlation analysis concerns the "Must Match"-parts of the information and is illustrated in FIG. 6a. The left part of the figure shows the analysis done in the first apparatus 24. The "Must Match"-part 27a of the "Who I am"-profile 27 associated with the first user, which profile describes the first, actual user, is compared to the "Must Match"-part 30a of the "Who I would like to meet"-profile 30 associated with the second user, which profile describes the fourth, desired user, and the result of the comparison is a first value of correlation, "$cv_1$". The first value of correlation, which is a number between 0 and 1, is simply a measure of how similar the first and the fourth user are regarding the "Must Match"-part. If the first value of correlation is 1, there is a complete match between the first and the fourth user regarding the "Must Match"-part. This means that the person that the second user would like to meet, i.e. the fourth user, so far actually is the first user. On the other hand, if the first value of correlation is 0, there is no match at all between the first and the fourth user regarding the "Must Match"-part. This means that the person that the second user would like to meet, i.e. the fourth user, is certainly not the first user. Then, by comparing the "Must Match"-part 28a of the "Who I would like to meet"-profile 28 associated with the first user, which profile describes the third, desired user, with the "Must Match"-part 29a of the "Who I am"-profile 29 associated with the second user, which profile describes the second, actual user, a second value of correlation, "$cv_2$", between 0 and 1 is obtained. In a corresponding way, a "$cv_2$" equal to 1 means that the person that the first user would like to meet, i.e. the third user, so far actually is the second user, and a "$CV_2$" equal to 0 means no match. The right part of FIG. 6a shows the analysis done in the second apparatus 26. As apparent from the figure, the analysis and results in the second apparatus are the same as in the first apparatus.

The first and the second value of correlation are to be compared with a first and a second threshold value, respectively. If the first and second values of correlation meet or exceed the respective first and second threshold values, the first and second users match each other well enough regarding the "Must Match"-parts, then the correlation analysis proceeds with the second step. However, if the first and second values of correlation do not meet or exceed the respective first and second threshold values, then there is considered no match between the first and the second user and the correlation analysis is terminated. In the preferred embodiment, the first and second threshold values are both equal to 1. Thus, the requirement for continuing with the second part of the correlation analysis concerning the "Query"-parts of the information, is that the first and the second user match each other completely regarding the "Must Match"-parts.

The second analysis step is illustrated in FIG. 6b. Again, the left part of the figure shows the analysis done in the first apparatus 24. The "Query"-part 27b of the "Who I am"-profile 27 associated with the first user, which profile describes the first user, is compared to the "Query"-part 30b of the "Who I would like to meet"-profile 30 associated with the second user, which profile describes the fourth user. The result of the comparison is a third value of correlation, "$CV_3$", between 0 and 1. The third value of correlation for the "Query"-parts corresponds to the first value of correlation for the "Must Match"-parts. In the right part of the figure the analysis in the second apparatus is illustrated. The "Query"-part 29b of the "Who I am"-profile 29 associated with the second user, which profile describes the second user, is compared to the "Query"-part 28*b* of the "Who I would like to meet"-profile 28 associated with the first user, which profile describes the third user. The result of the comparison is a fourth value of correlation, "$CV_4$", between 0 and 1. The fourth value of correlation for the "Query"-parts corresponds to the second value of correlation for the "Must Match"-parts.

The first apparatus 24 has a first high score list with room for a certain number of personal information tags with corresponding third values of correlation. As the name of the list indicates, the personal information tags with the highest scores, i.e. the highest corresponding third values of correlation, will be stored on the first high score list. Additionally, the last received personal information tag will always be stored on a certain first last-received-position in the memory of the first apparatus. Thus, prior to the correlation analysis, the second personal information tag 30*c* of the second apparatus 26 is stored on the first last-received-position in the memory of the first apparatus 24. After the correlation analysis has been performed, the second personal information tag 30*c* is also stored on the first high score list if it is not already full. In case the first high score list is full, the third value of correlation corresponding to the second personal information tag 30*c* is compared with the other third values of correlation already in the first high score list. The other third values of correlation each correspond to a personal information tag for a remote apparatus. If the third value of correlation corresponding to the second personal information tag 30*c* is higher than any of the other third values of correlation already on the first high score list, the lowest other third value of correlation on the list will be rejected together with the corresponding personal information tag, and replaced with the second personal information tag 30*c* and the corresponding third value of correlation. On the other hand, if the third value of correlation corresponding to the second personal information tag 30*c* is not high enough it will be rejected. When the first apparatus 24 receives a new personal information tag, the second personal information tag 30*c* will be replaced with the new one on the first last-received-position in the memory of the first apparatus 24.

Correspondingly, the second apparatus 26 has a second high score list and a second last-received-position in the memory, which have the same characteristics as the first high score list and the first last-received-position, and which function in a similar way with personal information tags with corresponding fourth values of correlation.

The third and the fourth value of correlation are final measures of the match between the first and the second user. As above, the third and fourth values of correlation are further to be compared with a third and a fourth threshold value, respectively. According to the preferred embodiment the third and the fourth threshold value can be chosen individually by the respective first and second users themselves. If the third value of correlation meets or exceeds the third threshold value, the person that the second user would like to meet, i.e. the fourth user, is considered by the first user, who has set the third value of correlation, to be sufficiently alike him/her. This is shown to the first user by the first apparatus 24 emitting an alert. This does not necessarily mean that the successful match is mutual, as will be shown by examples later on.

Correspondingly, if the fourth value of correlation meets or exceeds the fourth threshold value, the person that the first user would like to meet, i.e. the third user, is considered by the second user, who has set the fourth value of correlation, to be sufficiently alike him/her. This is shown to the second user by the second apparatus 26 emitting an alert.

Thus, if there is a mutual match between the first and the second user, both the first and the second apparatus will emit an alert.

According to alternative embodiments, the exchange of information is not made in one single step. It is also possible to perform the exchange in two or more steps. In one embodiment, the "Must Match"-parts are first exchanged, and the first and the second value of correlation are calculated. Then, only if the first and second values of correlation meet or exceed the first and second threshold values, respectively, which preferably both are 1, the second step of the exchange, i.e. the exchange of "Query"-parts, is performed. Then, only if the third and fourth values of correlation meet or exceed the third and fourth threshold values, respectively, the personal information tags are exchanged.

In the preferred embodiment the apparatus can emit different types of alerts according to the user's choice. For example, the alert can be the user's favorite love song or some other audible signal which allow for two users to find each other directly by match, by simply tracking the sound. A more discrete type of alert is a visual one, such as an indication in the display or a flashing lamp on the apparatus. An even more discrete alert is a perceptible one, such as a vibration which can only be sensed by the user.

Figure 7B:
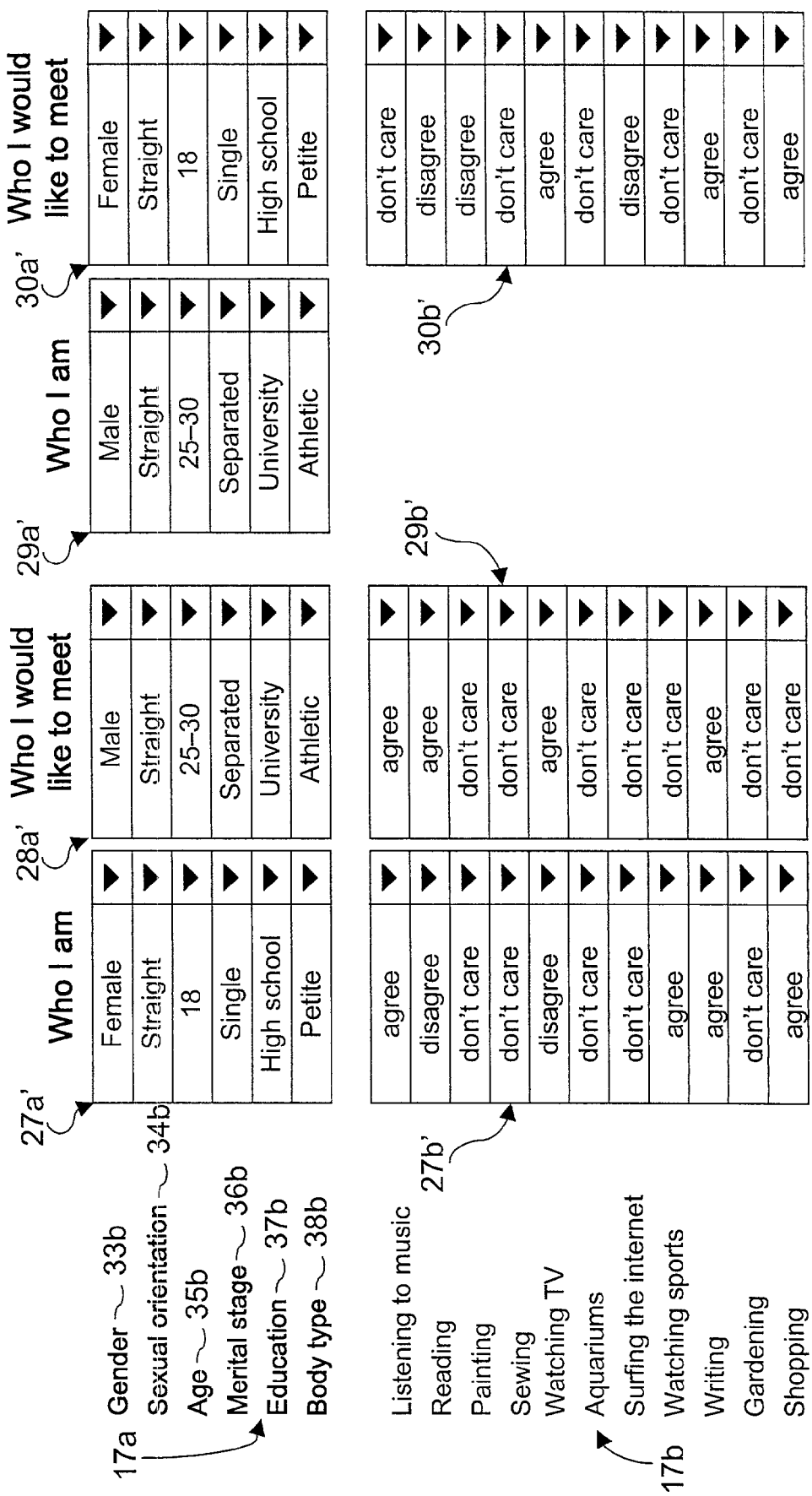
FIG. 7b shows information for two fictitious users.

FIGS. 7*a*–7*c* illustrate an example of what a correlation analysis could look like. FIG. 7*a* is a table of possible answers to the "Must Match"-questions shown in FIG. 4. Of course, these answers are just examples and they can be varied in numerous ways. FIG. 7*b* corresponds to the left part of FIG. 5*b*. It shows an example of what the information in the first apparatus 24 could look like after the exchange with the second apparatus 26. FIG. 7*c* illustrates how the result of the correlation analysis between the first and the second user can be calculated.

Figure 5B:
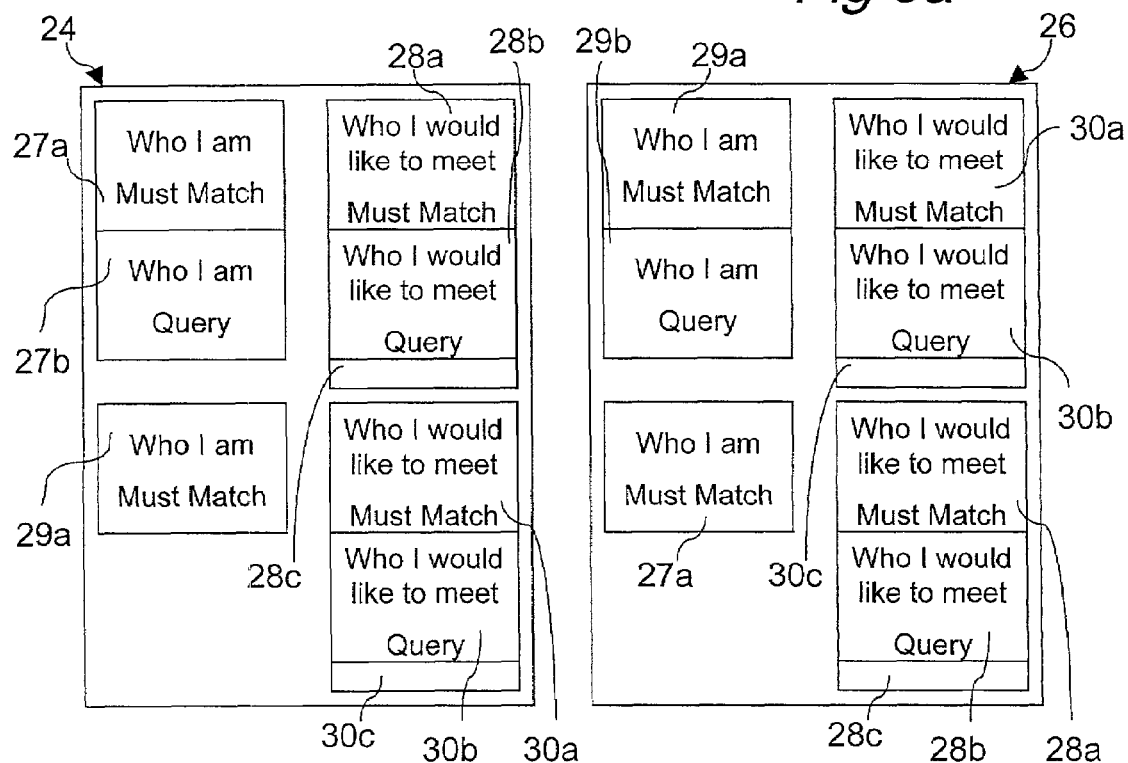

In FIG. 7*b*, the information boxes 27*a'*, 27*b'*, 28*a'*, 28*b'*, 29*a'*, 30*a'* and 30*b'* correspond to 27*a*, 27*b*, 28*a*, 28*b*, 29*a*, 30*a* and 30*b*, respectively, in FIG. 5*b*. The questions in the left part of FIG. 7*b* are the questions used in FIG. 4, i.e. the questions associated with the Dating profile kit. As explained with reference to FIG. 4, group 17*a* contains the "Must Match"-questions. The columns 33*a*–38*a* in FIG. 7*a* contain the corresponding answers to each of these "Must Match"-questions, which are denoted 33*b*–38*b*. Thus, column 33*a* contains answers to question 33*b* and so on. Each answer corresponds to a number from 1 and upwards. Group 17*b* contains the "Query"-questions as also explained with reference to FIG. 4. The corresponding possible answers to all of the "Query"-questions are in this example: "agree", "don't care" and "disagree". The default answer to all of the "Query"-questions is "don't care", which means that if a user does not change an answer it will be "don't care". In FIG. 7*b*, each of the questions have been answered by a choice of one of the possible answers for that question, as can be seen in 27*a'*–30*a'*, 27*b'*, 28*b'* and 30*b'*. However, for the "Must Match"-questions and the "Who I would like to meet"-profile it is possible to choose more than one answer to each question. Like for instance, if the first user wants to meet a partner of the age 18–20, he/she could choose the answers corresponding to number 4, 5, and 6 in column 35*a*. As another example, if the body type of a partner is unimportant to the first user, he/she could choose all the answers, i.e. the answers corresponding to number 1 to 11, in column 38*a*.

In the preferred embodiment the "Age"-question 35*b* is treated a little different from the rest of the questions regarding the "Who I am"-profile. When a user begins to use his/her apparatus he/she enters his/her date of birth into the apparatus. The age of the user will therefore automatically be completed in the in the "Who I am"-profile, and updated on the users birthday. This updating function can also be used with the "Age"-question 35*b* regarding the "Who I would like to meet"-profile, For example, the user might be interested in meeting a partner who is two years older than himself/herself. Then, the age in the "Who I would like to meet"-profile can always be automatically updated with one year on the users birthday.

In FIG. 7*c*, the result of the correlation analysis has been calculated. First, correlation analysis has been performed between the "Must Match"-parts as above described. Since 28*a*' equals 29*a*', and 27*a*' equals 30*a*', the first and the second value of correlation are both 1. As a result, correlation analysis has been performed also between the "Query"-parts as above described. The table 39 illustrates how this has been done. Each combination of two answers of the possible ones has been given a point −2, 0, 1 or 2, and a corresponding max point 0 or 2. The result for the correlation between 27*b*' and 30*b*' can be seen in column 40 in the right part of the FIG. 7*c*, where also the maximum points are shown in column 41. The final result of the correlation analysis is the total point divided by the total max point, (8/12). As can be seen, the result in this example is 66.67%, i.e. the first user is to 66.67% who the second user would like to meet, which means that the third value of correlation is 0.6667. Now, if the previously discussed conditions are fulfilled, i.e. if the first high score list is not full or if the third value of correlation is high enough, the second personal information tag will be stored on the first high score list in the first apparatus. Additionally, depending on the third threshold value, which is set by the first user in this embodiment, the first apparatus will emit an alert and alert the first user to the match.

As mentioned earlier, a match in one direction does not necessarily mean a match in the other direction. As an example, if the first user from above has set the third threshold value to 0.65, his/her apparatus will emit an alert. In the second apparatus the corresponding analysis has been performed, resulting in a fourth value of correlation of 0.79. If the second user has set the fourth threshold value to 0.75 there will be a double match, and the second apparatus will emit an alert and alert the second user of the match. However, if the second user instead has set the fourth threshold value to 0.80, there will be no double match.

In an alternative embodiment the third value of correlation is instead set by the second user, and the fourth value of correlation by the first user. In this latter case, the second user will make the decision if the first user is sufficiently alike the fourth user. In other words, it is up to the second user to decide if there is a match between him/her and the first user, i.e. whether the first apparatus should emit an alert or not. This embodiment means that also the third and fourth values of correlation have to be exchanged between the first and the second apparatus for the correlation analysis.

Figure 8:
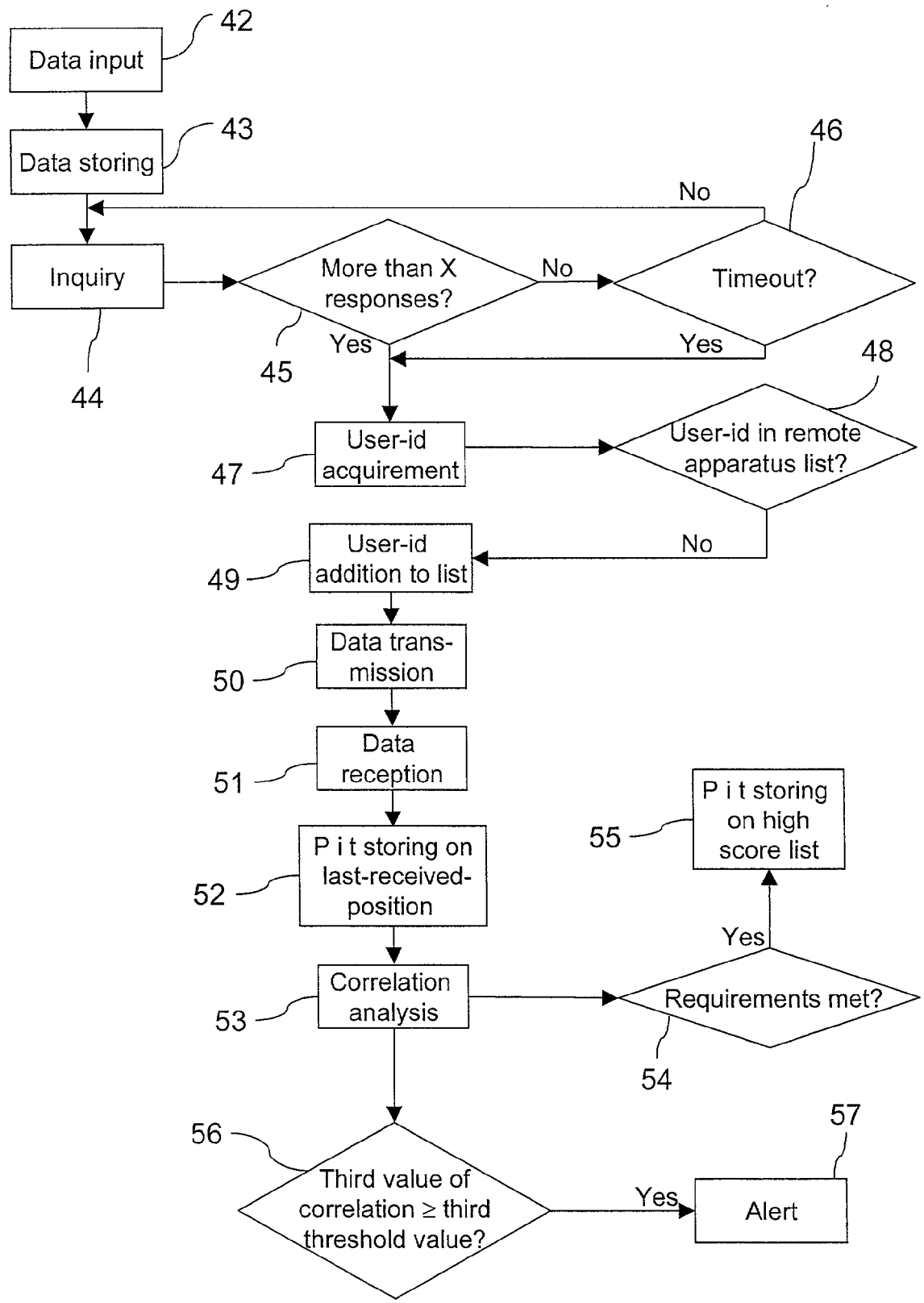
FIG. 8 is a flowchart illustrating the method according to the present invention.

FIG. 8 is a flowchart schematically illustrating the method according to a preferred embodiment of the present invention. Each block in the FIG. 8 corresponds to one step in the method. Initially, data is entered into an apparatus according to the present invention by a user as above described (block 42), and the data is stored in the memory of the apparatus (block 43). At time intervals, which are adjustable by the user but also can be handled automatically by the apparatus, the apparatus performs inquiry sessions (blocks 44, 45, 46), i.e. the apparatus searches for remote apparatuses within range. This is done by the apparatus performing inquiries, i.e. transmitting first radio frequency signals to, and receiving second radio frequency signals from, remote apparatuses within range (block 44). An inquiry session lasts for a predetermined time unless a predetermined maximum number of responses have been obtained from remote apparatuses, i.e. a maximum number of second radio frequency signals have been received. Thus, after an inquiry (block 44), the number of responses is checked (block 45). If the number of responses is more than the maximum number (X), the inquiry session is terminated, and if the responses are less than X, a check of the time is made (block 46). If there is a timeout, the inquiry session is terminated, if not, a new inquiry is performed. The above continues until the inquiry session is terminated. For the sake of simplicity, in the following it is assumed that the number of responses resulting from the inquiry session is one.

The apparatus has a remote apparatus list which contains user-id:s identifying remote apparatuses that the apparatus have had contact with. In the next step, the apparatus acquires the unique apparatus-specific user-id for the remote apparatus that responded in the inquiry session above (block 47). It is checked whether the acquired unique apparatus-specific user-id is already in the remote apparatus list (block 48). If it is in the list, the method returns to the inquiry session (block 44, 45, 46). If it is not, it is added to the remote apparatus list (block 49). After the addition, information is exchanged with the remote apparatus as described in detail earlier in the text, i.e. the apparatus transmits parts of its entered data (block 50) and receives corresponding parts of data from the remote apparatus (block 51). As described earlier, the received data contains the personal information tag (p i t) for the remote apparatus. This personal information tag is next stored on the last-received-position in the memory of the apparatus (block 52). Correlation analysis is thereafter performed between data initially entered into the apparatus by the user, and data received from the remote apparatus (block 53), as thoroughly described earlier in the text. After the correlation analysis, it is checked whether the requirements are met for storing the personal information tag associated with the remote apparatus on the high score list (block 54), which requirements were discussed in detail earlier. If they are met, the personal information tag is stored on the high score list (block 55). Thereafter, the result from the correlation analysis is compared with a threshold value (block 56) as discussed above, and depending on the result the apparatus will emit an alert to alert its user (block 57). Naturally, the steps of the method do not have to be performed in this exact order.

The above described apparatus and method should only be seen as examples. A person skilled in the art realizes that the embodiments discussed can be varied in a number of ways without deviating from the inventive conception.

The apparatus according to the present invention may, for example, be realized as a separate, stand-alone unit, or may alternatively be included in, or combined with, a mobile terminal for a telecommunications network, such as GSM, UMTS, GPS, GPRS or D-AMPS.

The present invention might be used in an application where an arbitrary personal computer (an apparatus) communicates with a server (a remote apparatus) over a wide area network to compare a user of the personal computer with a person in a database associated with the server.

Additionally, the invention is not restricted to be used in connection with matchmaking. It can be used in all applications where it is desirable to compare a first object, associated with a first set of data, with a second object, associated with a second set of data.

Further, the profiles and the sets of questions must not necessarily comprise one "Must Match"-part (group) and one "Query"-part (group). As a less preferable alternative, they could comprise only one part (group) of answers (questions) weighted with respect to their importance. In such an embodiment, answers (questions) concerning, for example, age, gender and sexual orientation should contribute more in the correlation analysis than answers (questions) concerning less important issues.

In an even less preferred embodiment, the profiles and the sets of questions comprise one part (group) of answers (questions) all weighted equally.

The number of different answers to a "Query"-question does not have to be three but can be any number. As an example, if the number is five, the possible answers could be "agree much", "agree", "don't care", "disagree" and "disagree very much".

In the described preferred embodiment, if the first user is sufficiently alike who the second user wants to meet, the first apparatus emits an alert. In a less preferred embodiment, it is the other way around, i.e. the second apparatus emits an alert if the first user is sufficiently alike who the second user wants to meet. A third possibility is a mutual emittance of alert in case of a match.

As another example, a central unit can be used together with the present invention. In that case, the central unit will receive information associated with the users, handle the correlation analysis for two users, and transmit the result of the analysis to the two users.

As one last example, although there are many more, the objects do not have to be human beings.

The invention claimed is:

1. A data processing apparatus for comparing a first object, associated with said data processing apparatus, with a second object, associated with a remote data processing apparatus, said data processing apparatus comprising:
   an input device operable to accept a first and a second set of data associated with said first object, said first set of data describing said first object and said second set of data describing a third object;
   a memory, wherein said memory is adapted to store said first and said second set of data;
   a receiver, wherein said receiver is adapted to obtain a first subset of a third and a fourth set of data, respectively, from said remote data processing apparatus, said third and said fourth set of data being associated with said second object, said third set of data describing said second object and said fourth set of data describing a fourth object;
   a transmitter, wherein said transmitter is adapted to send a first subset of said first and said second set of data, respectively, to said remote data processing apparatus; and
   a processor, wherein said processor is adapted to perform correlation analysis between said first subsets of said first and said fourth set of data, respectively, to obtain a first value of correlation between said first and said second object, and correlation analysis between said first subsets of said second and said third set of data, respectively, to obtain a second value of correlation between said first and said second object,
   wherein said receiver further is adapted to obtain a second subset of said fourth set of data from said remote data processing apparatus,
   wherein said transmitter further is adapted to send a second subset of said second set of data to said remote data processing apparatus, and
   wherein, if said first value of correlation meets or exceeds a first threshold value and said second value of correlation meets or exceeds a second threshold value, said processor further is adapted to perform correlation analysis between a second subset of said first set of data and said second subset of said fourth set of data, to obtain a third value of correlation between said first and said second object, said third value of correlation indicating a similarity between said fourth and said first object.

2. A data processing apparatus according to claim 1, wherein said first and said second threshold value are equal to 1, said first and said second value of correlation both equal to 1 representing that said first subset of said second set of data conforms completely to said first subset of said third set of data, and that said first subset of said fourth set of data conforms completely to said first subset of said first set of data.

3. A data processing apparatus according to claim 1, wherein said memory further is adapted to store at least one profile kit containing a first and a second profile, said first and said third set of data each containing a respective result of a completion of said first profile, and said second and said fourth set of data each containing a respective result of a completion of said second profile.

4. A data processing apparatus according to claim 3, wherein said first and second profiles relate to at least one set of questions, said completion corresponding to answers to said at least one set of questions.

5. A data processing apparatus according to claim 4, wherein said memory further is adapted to store said at least one set of questions.

6. A data processing apparatus according to claim 4, wherein said questions are of personal character and said objects are human beings, wherein said first object is a first user of said data processing apparatus, said second object is a second user of a remote data processing apparatus, said third object is a first desired person who said first user wishes to find, and said fourth object is a second desired person who said second user wishes to find, a match occurring for said second user with said first user if said third value of correlation meets or exceeds a third threshold value, said data processing apparatus being used as a mating apparatus.

7. A data processing apparatus according to claim 1, wherein said second subsets contain no data, the data in each of said first subsets being the data in each of said sets of data, respectively, wherein said third value of correlation is set equal to 1 if the first and the second value of correlation both meet or exceed the first and the second threshold value, respectively, and equal to 0 if not.

8. A data processing apparatus according to claim 1, wherein said first subsets contain no data, the data in each of said second subsets being the data in each of said sets of data, respectively, wherein said first and said second value of correlation is set equal to 1.

9. A data processing apparatus according to claim 1, further comprising an antenna, wherein said antenna is coupled to said receiver and said transmitter and is adapted for radio frequency communication with said remote data processing apparatus.

10. A data processing apparatus according to claim 9, wherein said radio frequency communication is in accordance with the Bluetooth standard.

11. A data processing apparatus according to claim 1, further comprising an alert device operable to alert if said third value of correlation meets or exceeds a third threshold value.

12. A data processing apparatus according to claim 11, wherein said alert device is adapted to emit an audible alert.

13. A data processing apparatus according to claim 11, wherein said alert device is adapted to emit a perceptible alert.

14. A data processing apparatus according to claim 11, wherein said alert device is adapted to emit a visual alert.

15. A data processing apparatus according to claim 11, wherein said third threshold value can be selected by a user.

16. A data processing apparatus according to claim 1, wherein said input device comprises a keyboard.

17. A data processing apparatus according to claim 1, wherein said input device comprises a connector to an external computer.

18. A data processing apparatus according to claim 1, further comprising a display, wherein said display is adapted to interact with a user of said data processing apparatus.

19. A data processing apparatus according to claim 1, further comprising encryption means adapted to encrypt data prior to transmission, and decryption means adapted to decrypt data after reception.

20. A data processing apparatus according to claim 1, being wireless and portable.

21. A data processing apparatus according to claim 1, being included in a mobile terminal for a telecommunications network.

22. A method of comparing a first object, associated with a data processing apparatus, with a second object, associated with a remote data processing apparatus, comprising:
inputting a first and a second set of data associated with said first object into said data processing apparatus, said first set of data describing said first object and said second set of data describing a third object;
storing said first and said second set of data in said data processing apparatus;
receiving a first subset of a third and a fourth set of data, respectively, from said remote data processing apparatus into said data processing apparatus, said third and said fourth set of data being associated with said second object, said third set of data describing said second object and said fourth set of data describing a fourth object;
transmitting a first subset of said first and said second set of data, respectively, to said remote data processing apparatus from said data processing apparatus;
performing, by means of said data processing apparatus, correlation analysis between said first subsets of said first and said fourth set of data, respectively, to obtain a first value of correlation between said first and said second object, and correlation analysis between said first subsets of said second and said third set of data, respectively, to obtain a second value of correlation between said first and said second object;
receiving a second subset of said fourth set of data from said remote data processing apparatus into said data processing apparatus;
transmitting a second subset of said second set of data to said remote data processing apparatus from said data processing apparatus; and
if said first value of correlation meets or exceeds a first threshold value and said second value of correlation meets or exceeds a second threshold value, performing, by means of said data processing apparatus, correlation analysis between a second subset of said first set of data and said second subset of said fourth set of data, to obtain a third value of correlation between said first and said second object, said third value of correlation indicating a similarity between said fourth and said first object.

23. A method according to claim 22, further comprising setting said first and said second threshold value equal to 1, said first and said second value of correlation both equal to 1 representing that said first subset of said second set of data conforms completely to said first subset of said third set of data, and that said first subset of said fourth set of data conforms completely to said first subset of said first set of data.

24. A method according to claim 24, further comprising storing, in said data processing apparatus, at least one profile kit containing a first and a second profile, said first and said third set of data each containing a respective result of a completion of said first profile, and said second and said fourth set of data each containing a respective result of a completion of said second profile.

25. A method according to claim 24, further comprising storing, in said data processing apparatus, at least one set of questions, said first and second profiles relating to said at least one set of questions, said completion corresponding to answers to said at least one set of questions.

26. A method according to claim 22, further comprising radio frequency communicating, in accordance with the Bluetooth standard, with said remote data processing apparatus.

27. A method according to claim 22, further comprising alerting if said third value of correlation meets or exceeds a third threshold value.

28. A method according to claim 22, further comprising encrypting data prior to transmission, and decrypting data after reception.

29. A computer program product directly loadable into a memory of a processor, the computer program product comprising program code for performing the steps of the method defined in claim 22 when executed by said processor.

* * * * *

UNITED STATES PATENT AND TRADEMARK OFFICE
CERTIFICATE OF CORRECTION

| | | |
|---|---|---|
| PATENT NO. | : 7,065,345 B2 | Page 1 of 1 |
| APPLICATION NO. | : 10/125404 | |
| DATED | : June 20, 2006 | |
| INVENTOR(S) | : Stephen J. Carlton et al. | |

It is certified that error appears in the above-identified patent and that said Letters Patent is hereby corrected as shown below:

Column 20, line 27, "claim 24" should read --claim 22--.

Signed and Sealed this

Third Day of October, 2006

JON W. DUDAS
*Director of the United States Patent and Trademark Office*